United States Patent Office 3,168,265
Patented Feb. 2, 1965

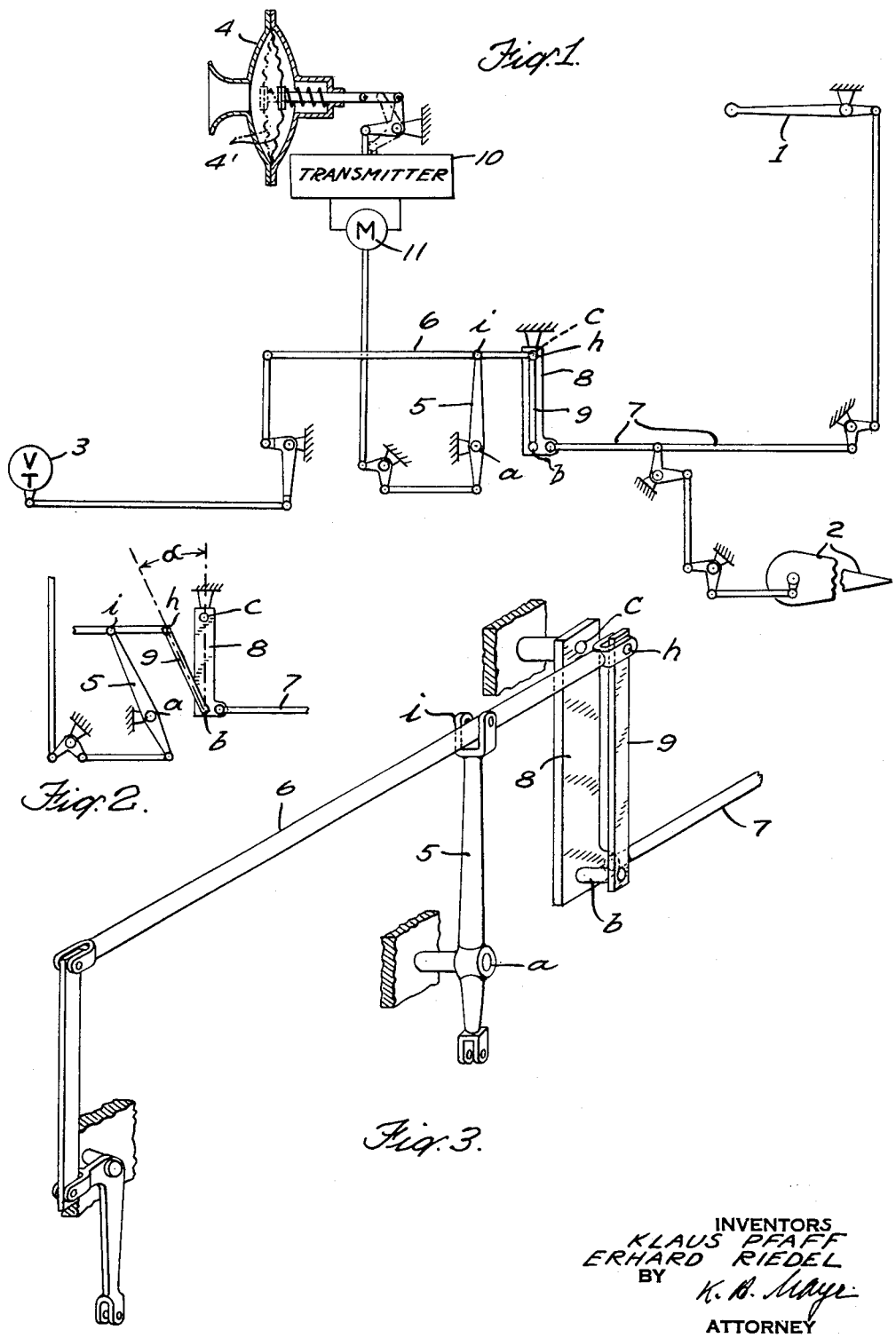

3,168,265
CONTROL SYSTEM FOR AIRCRAFT WITH SLOW FLIGHT OR HOVERING CHARACTERISTICS, IN PARTICULAR FOR VERTICALLY STARTING AND LANDING AIRCRAFT
Klaus Pfaff, Meersburg, and Erhard Riedel, Friedrichshafen, Germany, assignors to Dornier-Werke G.m.b.H., Friedrichshafen, Germany, a firm of Germany
Filed Sept. 12, 1963, Ser. No. 308,588
Claims priority, application Germany, Sept. 14, 1962, D 39,844
7 Claims. (Cl. 244—76)

In aircraft with slow flight characteristics, particularly in aircraft which are equipped with lifting or vertical thrust engines and which can start and land vertically, and have hovering characteristics, stabilization and control still present difficulties. Aerodynamic control surfaces are provided for the conventional horizontal flight. There are no aerodynamic control forces available in vertical flight, since the aircraft's speed is too slow. Therefore, stabilization and control have been effected by means of gas jets. The two entirely different control systems, namely, that of aerodynamic control of the horizontal flight and that of the jet control for the vertical flight must be coupled with one another. This coupling originates in some instances on one and the same control stick, whereby the control systems are so synchronized for the individual flying positions that in each instance they provide the highest measure of safety and the flight characteristics reach an optimum with regard to control. Hereby the problem of control and stability when hovering and during the changeover to conventional horizontal flight is of particular importance. Devices are required which will dependably accomplish the interaction or changeover from one kind of control to the other, depending on the flight position and speed. A continuous transition from the jet control to aerodynamic surface control and vice versa is thus to be striven for.

Conventional control devices in aircraft with vertical thrust engines provide, for example, in the rolling moment controls, a rigid connection of the ailerons with the fuel or power gas control throttles of the vertical thrust engines when the latter are arranged laterally of the longitudinal axis of the aircraft. Therefore, during each movement of the control stick, the ailerons or wing flaps and the fuel or power gas control throttles are simultaneously actuated. Since, when the aircraft is hovering, the vertical thrust engines take over fully and completely the rolling moment stabilization, the ailerons are moved along in vain and without effect. During the changeover from hovering to conventional horizontal flight, the aerodynamic control surfaces take care of a part of the control moments, depending on the dynamic pressures, while the jet controls continue to be effective through their entire control range. The effect of the ailerons increases with increasing horizontal speed of the aircraft. After reaching the conventional flight condition the lifting or vertical thrust engines are stopped. Due to the sudden lack of the control moment provided by the lifting engines there is an undesirable discontinuity in the control operation which has a disturbing effect. The movement of the control stick has now less effect on the flying position of the aircraft. This may irritate the pilot and he may require a certain period of time during each changeover from vertical to horizontal flight to become accustomed to the changed control sensitiveness of the aircraft. The previous great length of travel of the control stick when the aircraft was hovering is also a disadvantage. To assure a sensitive manual control and a satisfactory stabilization of the aircraft, the length of travel of the control stick should be as small as possible.

It is the object of the invention to provide a simple and effective control system for aircraft with slow flight characteristics. This object is achieved by interposing a device in the control mechanism between the control means and the controlled element which device acts as a variable ratio transmission and essentially comprises two levers of equal length and connected at one of their ends by a common hinge joint. Means are provided for adjusting the relative angular position of the two levers and thereby the transmission ratio of the lever arrangement in response to a value which corresponds to the forward speed.

In aircraft with slow flight characteristics, particularly in vertically starting and landing aircraft, wherein, in addition to the aerodynamic control surface regulation, a jet control is provided for the slow forward flight and hovering or vertical flight the aforesaid transmission device may be inserted in the control mechanism ahead of the jet control device. This makes it possible to counterbalance the decreased effectiveness of the aerodynamic control surface at diminishing flight speed by increased effectiveness of the jet control.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a schematic representation of a control system according to the invention.

FIG. 2 shows a portion of the system shown in FIG. 1 in a different operating position.

FIG. 3 is a more elaborate perspective view of the mechanism shown schematically in FIG. 2.

Figure 4:
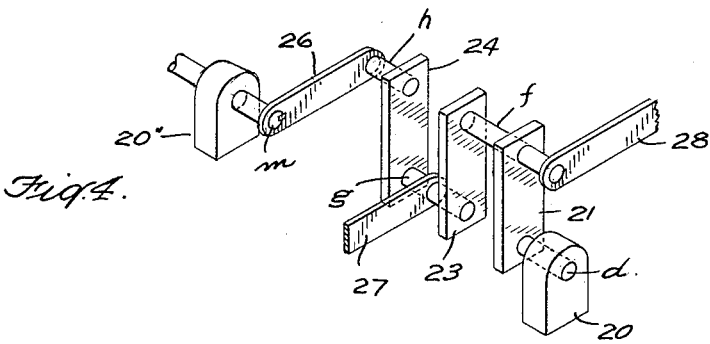
FIGS. 4 and 5 show, in perspective, a modification of the mechanism according to the invention in two different operating positions.

In the embodiment shown in FIG. 1, the control installation is simplified and shown in combination with an aileron and jet control for controlling rolling moments.

For the sake of clarity, means effecting other control movements, for example for controlling yaw and pitch, have been omitted. These means are analogous to the mechanism which will now be described.

In the described example it is assumed that the transverse control surfaces and the fuel throttles of the lifting engines which are disposed laterally of the longitudinal axis of the aircraft and which are used for attitude control, are actuated by the control stick. Of course, another element, for example, one located in or at the nozzles of the engines may be actuated. The lever arrangement is shown in FIG. 1 in the position for horizontal flight. The forward speed may be indicated by measuring various criterions, for example, by measuring the aerodynamic pressure; it may be indicated by electronic devices, for example a Doppler radar device, or, when using swingable jets for selectively producing horizontal or vertical thrust, by the jet nozzle position. In the illustrated example, aerodynamic pressure is chosen as a measure for the speed of the forward flight.

In FIG. 1, numeral 1 designates a control stick, 2 at aerodynamic control surface, 3 a fuel throttle valve, 4a dynamic air pressure responsive diaphragm device, 5, 6 and 7 elements pertaining to a transmission or changeover device according to the invention, and numerals 8 and 9 designate two levers of equal length and connected to and swingable on a common pivot *b* affording adjustment of the relative angular position of the levers 8 and 9.

In FIG. 2 the levers 5, 6, 8, 9 are shown in the positions when the aircraft is hovering. The angle α between the levers 8 and 9 is a measure for the transmission ratio of the changeover device according to the invention.

In FIG. 3 the changeover arrangement is shown in perspective for better clarity. The position of the lever 5 depends on the dynamic air pressure acting on the device 4. The lever 5 swings around a stationary fulcrum *a*. This causes a substantial axial movement of the rod 6 and swinging of the lever or link 9 relative to the lever or arm 8 and about the pivot *b*. When the elements 8 and 9 are parallel, movement of the stick 1 and the rod 7 has no effect on the rod 6. When the elements 8 and 9 form an angle with one another, a variable amount of relative movement of the rods 7 and 6 is possible, depending on the angular position of the elements 8 and 9. At a dynamic air pressure acting on the device 4 which is practically zero, lever 5 swings counterclockwise around fulcrum *a* and a complete angular deflection α of the lever 9 takes place (FIG. 2). The link 6 is moved to the left, swinging lever 9, to which the link 6 is pivotally connected at *h*, in counterclockwise direction around pivot *b*. The levers 8 and 9 are now placed at the angle α as shown in FIGURE 2. If now the rod 7 is pushed to the left, lever 9 pushes pivot *h* upward, causing counterclockwise swinging of lever 6 around fulcrum *i*. Movement of the rod 7 to the right causes pulling down of pivot *h* by the lever 9 and clockwise swinging of lever 6 around pivot *i*. At these operations levers 8 and 9 swing on the common pivot *b* which is supported through lever 8 by pivot *c*. In the position shown in FIGURE 2, the actuation of the throttle valve 3 per degree of movement of the control stick, is at its greatest. The transmission ratio is at its maximum, which is determined by the length of the elements 8 and 9. Increasing dynamic air pressure during the changeover to horizontal flight and swinging of lever 5 caused thereby, reduces the angle between the elements 8 and 9 and actuation of the throttle valve 3 becomes smaller per degree of movement of the control stick and of the aerodynamic control surface 2. At unchanged extent of actuation of the throttle valve 3, the required displacement of the control stick and of the control surface 2 becomes greater at decreasing aerodynamic pressure acting at 4. The effect of the aerodynamic control surface 2 becomes greater at increasing horizontal speed and corresponding increasing dynamic air pressure.

When the aircraft has reached the horizontal speed necessary for the purely aerodynamic control and there is thus available a corresponding dynamic air pressure, a complete overlapping of the elements 8 and 9 takes place without any angle between their longitudinal axes. As is apparent from the drawing, the movements of the control stick are then transferred only to the control surface 2. The rod 7 merely causes a rotation of the elements 8 and 9 about the center line of the stationary pivot *c*, rigidly secured to the aircraft and swingably supporting the lever 8. At these conditions the pivot *h* swingably connecting one end of link 6 and the upper end of link 9 is in line with pivot *c*. There is no swinging of the lever 6 around the pivot *i* and therefore no actuation of the throttle valve 3. The device may be locked in this position and the lifting engines stopped, without a sudden fluctuation of attitude control.

In order to prevent an undesired effect of the movement of the rod 6 when the control stick 1 is manipulated, the diaphragm 4' actuates a transmitter 10 which controls the operation of a motor operator 11. In this way movement of the diaphragm causes movement of the lever 5 and of the rod 6 but movement of the elements 5 and 6 is not transmitted to the diaphragm.

Figure 5:
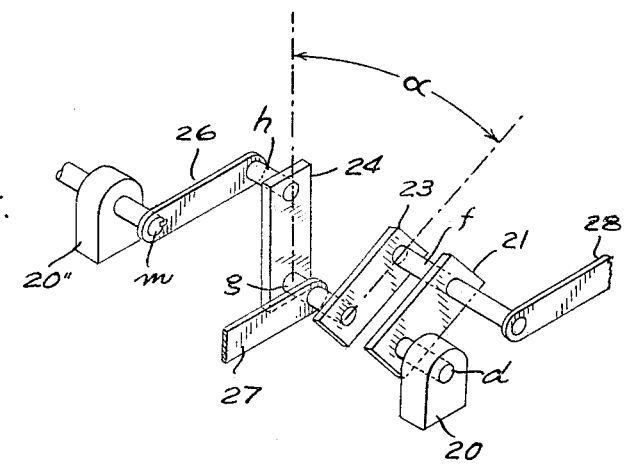

Whereas in the mechanisms shown in FIGS. 1, 2 and 3, the lever or link 9 is adjustable in response to the forward speed of the aircraft, in the embodiment of the invention shown in FIGS. 4 and 5 the position of the lever or arm 8 is adjustable. In FIGS. 4 and 5 the following parts correspond in their function to the following parts of FIGS. 1 to 3:

Joint *g* corresponds to joint *b*,
Joint *f* corresponds to joint *c*, but is not fast on the aircraft,
Rod 27 corresponds to rod 7,
Lever 23 corresponds to lever 8,
Lever 24 corresponds to lever 9,
Element 28 corresponds to lever 5.

FIG. 4 illustrates the mechanism in the position for fast horizontal flight whereby the elements 23 and 24 are parallel. FIG. 5 shows the mechanism at an angular displacement of the elements 23 and 24 caused by a diminished forward speed of the aircraft. A bearing 20 for a pivot *d* is rigidly secured to the aircraft. Lever 21, which serves for turning lever 23 about pivot *g* around which also lever 24 swings, is swingable around pivot *d*, the extent of angular displacement of lever 21 depending on the aerodynamic pressure which acts on the lever 21 through a rod 28. The arm 27 is operatively connected to the control stick. The lever 24 swings on the pivot *g* and is swingably connected by pivot *h* to an arm 26 extending from a shaft *m* turning in a bearing 20'' and operatively connected to the throttle valve 3 for actuating the latter. Swinging of the lever 21 on the pivot *d* causes a change of the angle at which the lever 23 and 24 are placed. If the levers 23 and 24 are parallel the pivots *f* and *h* are coaxial and movement of the element 27, i.e. movement of the control stick has no effect on the position of the pivot *h*. If the element 28 is moved into the position shown in FIG. 5 by the motor operator 11 and held in this position, a movement of element 27 in the direction of one of the arrows 12 causes displacement of pivot *g* out of alignment with pivot *d* and a swinging of the link or lever 24 about the pivots *g* and *h* and up or down movement of the latter. This causes swinging of lever 26 and rotation of the shaft *m* and actuation of throttle 3.

The elements 28, 21, 23 are swingable on the pivot *f*. The pivot *d* may be rotatable in the bearing 20. The elements 23, 27, 24 are swingable on the pivot *g* and the elements 24 and 26 are swingable on the pivot *h*.

Figure 6:
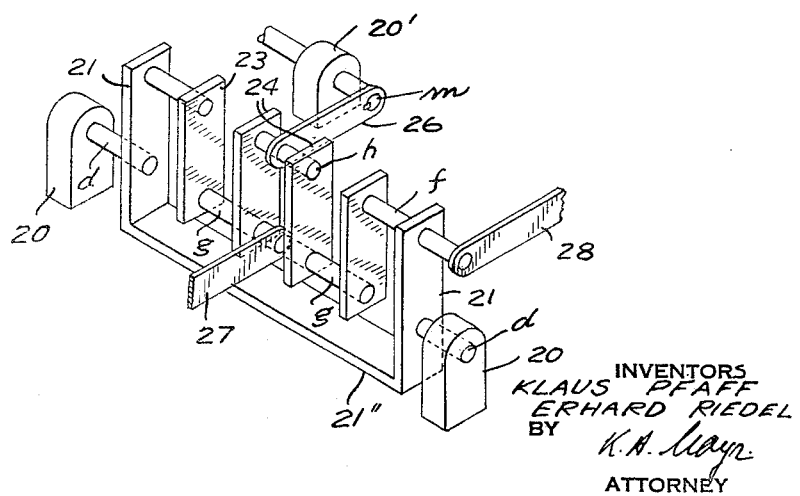
FIG. 6 is a perspective view of yet another modification of the mechanism according to the invention.

The mechanism shown in FIG. 6 is fundamentally the same as the mechanism shown in FIGS. 4 and 5. In the modification shown in FIG. 6, however, each of the elements 21, 23 and 24 is formed by two identical elements. The two elements 21 are rigidly connected by a bar 21'' and two bearings 20 are provided. The arrangement according to FIG. 6 affords accurate support of all elements and eliminates jamming which is important, if the control forces are great.

Figure 7:
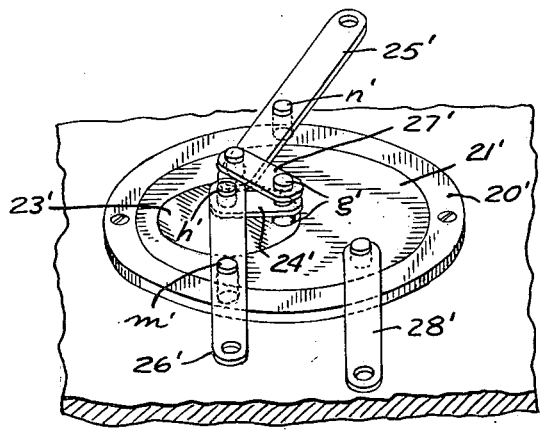
FIGS. 7 and 8 illustrate a further constructional embodiment of the mechanism according to the invention in two different operating positions.
Figure 8:
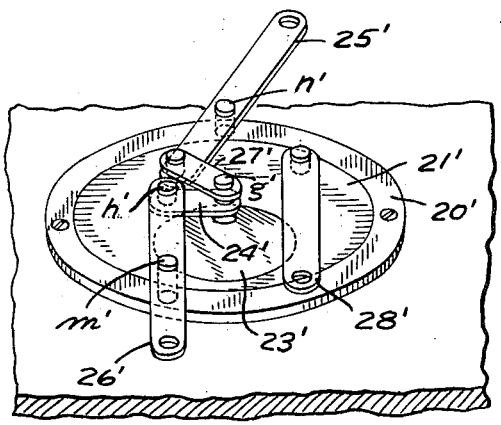

FIGS. 7 and 8 illustrate a further embodiment of the invention. FIG. 7 shows the mechanism in position for fast horizontal flight and FIG. 8 shows the mechanism in position for vertical flight and hovering.

Numeral 20' designates a circular ring rigidly mounted on the aircraft. A disc 21' is rotatable in the ring 20'. A second disc 23' is rotatably and eccentrically mounted in the disc 21' and includes the center of the disc 21'. The disc 21' can be rotated by means of a link 28' which is operatively connected to a device responsive to the horizontal flight speed of the aircraft. One end of each of links 24' and 27' are swingable on a common pivot *g'* which is made fast on the disc 23'. The other end of link 24' is pivotally connected at *h'* to a lever 26'. The latter swings on a pivot *m'* mounted on the ring 20' and is operatively connected to a device for controlling the attitude of the vertically flying or hovering aircraft, for example, a valve for controlling gas flow through a jet nozzle. The second end of the link 27' is pivotally connected to a lever 25' which swings on a pivot n' mounted on the ring 20'. The lever 25' is operatively connected to actuating means, for example a control stick, for controlling means for controlling the attitude of the aircraft. Swinging of lever 25' causes rotation of the disc 23'. In the position shown in FIG. 7 the axis of the disc 23' coincides with the axis of the pivot h'. In the position of the device in FIG. 7 the lever 26' is not moved upon swinging of the lever 25'.

In the position shown in FIG. 8 the link 28' has turned the disc 21' and has therefore also changed the position of the disc 23'. The axis of pivot h' does not extend any more through the center of the disc 23' and swinging of the lever 25' causes swinging of the lever 26'. The transmission ratio of the movement of the lever 25' to that of the lever 26' corresponds to the angle made by the link 24' with the line connecting the centers of the discs 21' and 23'.

The arrangement according to the invention makes possible various control positions of the throttle valves controlling jets for controlling the attitude of an aircraft for each position of the control stick, according to the horizontal flight speed of the aircraft. The movement transmission ratio of the mechanisms shown and described from the control stick to the throttle valves enables full use of the jet attitude control while the ailerons or other aerodynamic control surfaces are moved very little, during vertical flight and hovering. The arrangement according to the invention affords adjustment of the optimal transmission ratio for hovering as well as horizontal flight. The transmission ratio is changed continuously. The ailerons are moved little and slowly when the aircraft hovers whereas the jet throttle means are moved quickly and are fully effective. Because of the continuous increase or decrease of the part played by one of the attitude control means on the total required attitude control force up to maximal effect of one of the attitude control means and down to stopping of said control means there is no sudden change or disturbance of the control behavior of the aircraft. As described above, the insertion of a transmission arrangement in the control mechanism ahead of the jet control valves a certain movement of the control stick produces different throttle movement depending on the horizontal speed of the aircraft. The transmission arrangement can also be used for effectively operating aerodynamic surfaces for attitude control. The transmission mechanism according to the invention makes it possible to actuate aerodynamic attitude control surfaces to a different extent, with the same movement of the control stick, the extent of the movement of the surfaces depending on the speed of the horizontal flight. The arrangement according to the invention is much simpler than conventional arrangements using servomotors for producing transmission ratios depending on the flight speed.

The control mechanism according to the invention is suitable for controlling rolling, yawing, pitching or tipping moments. Instead of the control stick automatically acting devices for initiating control measures may be used in combination with the system according to the invention.

What is claimed is:

1. In an aircraft adapted for slow horizontal flight and for hovering and vertical flight:
    first attitude control means for controlling the attitude of the aircraft during horizontal flight,
    second attitude control means for controlling the attitude of the aircraft during hovering and vertical flight,
    regulating means operatively connected to said attitude control means,
    actuating means connected to said regulating means for actuating said regulating means,
    said regulating means including adjustable transmission means for adjusting the relative effect of said actuating means on said first and said second attitude control means, and
    means responsive to the horizontal flight speed of the aircraft, said speed responsive means being operatively connected to said transmission means for decreasing the effect of said actuating means on said second attitude control means upon increasing horizontal flight speed, and conversely.

2. In an aircraft as defined in claim 1 wherein said adjustable transmission means includes two levers, one end of one of said levers being pivotally connected to one end of the second lever, said actuating means including means pivotally connected to the one end of one of said levers which end is pivotally connected to the second lever, said regulating means including means pivotally connected to the second end of said second lever, the first end of the second lever being pivotally connected to the aircraft, and said speed responsive means being operatively connected to the second end of said second lever.

3. In an aircraft according to claim 2 and wherein the said levers are equally long and the longitudinal axes of said levers are parallel and the pivotal connections at the second ends of said levers are coaxial when the aircraft is moving at a predetermined horizontal speed.

4. In an aircraft as defined in claim 1 wherein said adjustable transmission means includes two levers, one end of one of said levers being pivotally connected to one end of the second lever, said actuating means including means pivotally connected to the one end of one of said levers which end is pivotally connected to the second lever, said regulating means including means pivotally connected to the second end of said second lever, and a lever having one end pivotally connected to the aircraft and having a second end pivotally connected to the first end of said second lever, said speed responsive means being operatively connected to the second end of said lever whose first end is pivotally connected to the aircraft.

5. In an aircraft according to claim 4 wherein the said levers are equally long and the longitudinal axes of said levers are parallel and the pivotal connections at the second ends of said levers are coaxial when the aircraft is moving at a predetermined horizontal speed.

6. In an aircraft as defined in claim 1 wherein said adjustable transmission means includes a first disc rotatably mounted on the aircraft, a second disc rotatably and eccentrically mounted on said first disc and including the center of said first disc, said speed responsive means being operatively connected to said first disc for rotating said first disc upon a change of the horizontal flight speed of the aircraft, said actuating means being operatively connected to said second disc for rotating said second disc, a link having one end swingably connected to said second disc at the same location where said actuating means is connected to said second disc, the second end of said link being operatively connected to said second attitude control means.

7. In an aircraft adapted for slow horizontal flight and for hovering:
    adjustable aerodynamic surface means for controlling the attitude of the aircraft during horizontal flight,
    adjustable jet means for controlling the attitude of the aircraft during hovering,
    control means operatively conected to said aerodynamic surface means and to said jet means,
    actuating means connected to said control means for actuating said control means,
    said control means including adjustable transmission means for adjusting the relative effect of said actuating means on said surface means and on said jet means, and
    means responsive to the forward speed of the horizontally flying aircraft,
    said speed responsive means being operatively connected to said transmission means for increasing the effect of said actuating means on said jet means upon decreasing horizontal speed of the aircraft, and conversely.

References Cited by the Examiner
UNITED STATES PATENTS

| | | | |
|---|---|---|---|
| 2,191,250 | 2/40 | Fischel | 244—76 |
| 2,205,610 | 6/40 | Van Nes | 244—83 |
| 3,065,939 | 11/62 | Lucien | 244—76 |
| 3,069,117 | 12/62 | Reid | 244—75 |
| 3,114,520 | 12/63 | Finvold | 244—75 |

MILTON BUCHLER, *Primary Examiner.*

ANDREW H. FARRELL, *Examiner.*